(12) United States Patent
Bysani Venkata Naga et al.

(10) Patent No.: US 12,683,808 B2
(45) Date of Patent: Jul. 14, 2026

(54) CERTIFICATE MANAGEMENT

(71) Applicant: Cohesity, Inc., San Jose, CA (US)

(72) Inventors: Suresh Bysani Venkata Naga, San Jose, CA (US); Apurv Gupta, Bangalore (IN)

(73) Assignee: Cohesity, Inc., Santa Clara, CA (US)

( * ) Notice: Subject to any disclaimer, the term of this patent is extended or adjusted under 35 U.S.C. 154(b) by 507 days.

(21) Appl. No.: 17/402,187

(22) Filed: Aug. 13, 2021

(65) Prior Publication Data

US 2022/0078033 A1     Mar. 10, 2022

Related U.S. Application Data

(60) Provisional application No. 63/074,685, filed on Sep. 4, 2020.

(51) Int. Cl.
*H04L 9/32*          (2006.01)
*G06F 9/54*          (2006.01)
(52) U.S. Cl.
CPC .............. *H04L 9/3268* (2013.01); *G06F 9/54* (2013.01)
(58) Field of Classification Search
CPC . H04L 9/3268; H04L 63/0823; H04L 9/3263; G06F 9/54; G06F 21/604; G06F 21/64
See application file for complete search history.

(56) References Cited

U.S. PATENT DOCUMENTS

| | | | |
|---|---|---|---|
| 10,003,467 B1 * | 6/2018 | Miller | H04L 9/3268 |
| 10,652,030 B1 * | 5/2020 | Levy | H04L 9/3268 |
| 10,931,451 B2 * | 2/2021 | De Atley | H04L 9/3247 |
| 2005/0138364 A1 * | 6/2005 | Roskind | H04L 9/3234 |
| | | | 713/156 |
| 2016/0080363 A1 * | 3/2016 | Taboso | H04L 63/1425 |
| | | | 713/156 |
| 2016/0154967 A1 * | 6/2016 | Lee | G06F 21/30 |
| | | | 713/189 |
| 2017/0104748 A1 * | 4/2017 | Koster | H04L 9/3268 |
| 2017/0339138 A1 * | 11/2017 | Lewison | H04L 63/0861 |
| 2018/0262472 A1 * | 9/2018 | Frederick | H04L 9/0819 |
| 2018/0322274 A1 * | 11/2018 | Lutz | G06F 21/44 |
| 2019/0020641 A1 * | 1/2019 | Wasily | H04L 9/3213 |
| 2019/0036730 A1 * | 1/2019 | Dresselhaus | G05B 19/0428 |
| 2019/0363895 A1 * | 11/2019 | Barr, III | H04L 67/568 |
| 2020/0036704 A1 * | 1/2020 | Chu | H04L 9/006 |
| 2020/0136838 A1 * | 4/2020 | Kucharski | H04L 9/3265 |
| 2020/0175208 A1 * | 6/2020 | Yu | H04L 9/3236 |
| 2020/0259668 A1 * | 8/2020 | Loreskar | G06F 21/44 |
| 2020/0274862 A1 * | 8/2020 | Varvarezis | H04L 9/0825 |
| 2020/0285752 A1 * | 9/2020 | Wyatt | G06F 21/566 |
| 2021/0357198 A1 * | 11/2021 | Cherches | H04L 63/0823 |
| 2022/0029988 A1 * | 1/2022 | Levin | H04L 63/0823 |

* cited by examiner

*Primary Examiner* — Blake I Narramore
(74) *Attorney, Agent, or Firm* — Shumaker & Sieffert, P.A.

(57)          ABSTRACT
Metadata included in a certificate received from an application or service is analyzed. The application or service is permitted to communicate with other applications or services associated with a data management as a service infrastructure based on a version number associated with a storage tenant included in the analyzed metadata.

20 Claims, 4 Drawing Sheets

200

Receive A Certificate — 202

Analyze Metadata Included In The Certificate — 204

206

Version # Included In Certificate Different Than Reference Certificate Version #?

Yes ▶ Deny Connection — 208

No

Permit Connection — 210

CERTIFICATE MANAGEMENT

CROSS REFERENCE TO OTHER APPLICATIONS

This application claims priority to U.S. Provisional Patent Application No. 63/074,685 entitled CERTIFICATE MANAGEMENT filed Sep. 4, 2020 which is incorporated herein by reference for all purposes.

BACKGROUND OF THE INVENTION

A storage provider may provide a Data Management as a Service (DMaaS) infrastructure to enable a user associated with an entity (e.g., enterprise, organization, government, company, user, individual, etc.) to manage data associated with the entity using one or more cloud services provided by the storage provider. For example, the one or more cloud services may include Backup as a Service (BaaS), Archive as a Service (AaaS), and/or Disaster Recovery as a Service (DRaaS).

The DMaaS infrastructure may include a control plane that is configured to manage the DMaaS infrastructure that enables users associated with an entity to remotely access and manage their data. The control plane may be responsible for managing various certificates for the purposes of both server validation and client validation. The DMaaS infrastructure may include a private certificate authority that issues private certificates to different services or applications within the DMaaS infrastructure. Private certificates may be used to avoid the costs associated with public certificates.

However, maintaining a private certificate authority is not trivial. Maintaining a private certificate authority may include managing a private key, a self-signed certificate for the private key, a list of all the certificates that were issued, a list of all the certificates which are revoked (e.g., a certificate revocation list or CRL), a policy for issuing the certificates, services for publishing the CRL to validate certificates, and/or continuously keeping track of security updates for managing certificates.

BRIEF DESCRIPTION OF THE DRAWINGS

Various embodiments of the invention are disclosed in the following detailed description and the accompanying drawings.

DETAILED DESCRIPTION

Figure 1A:
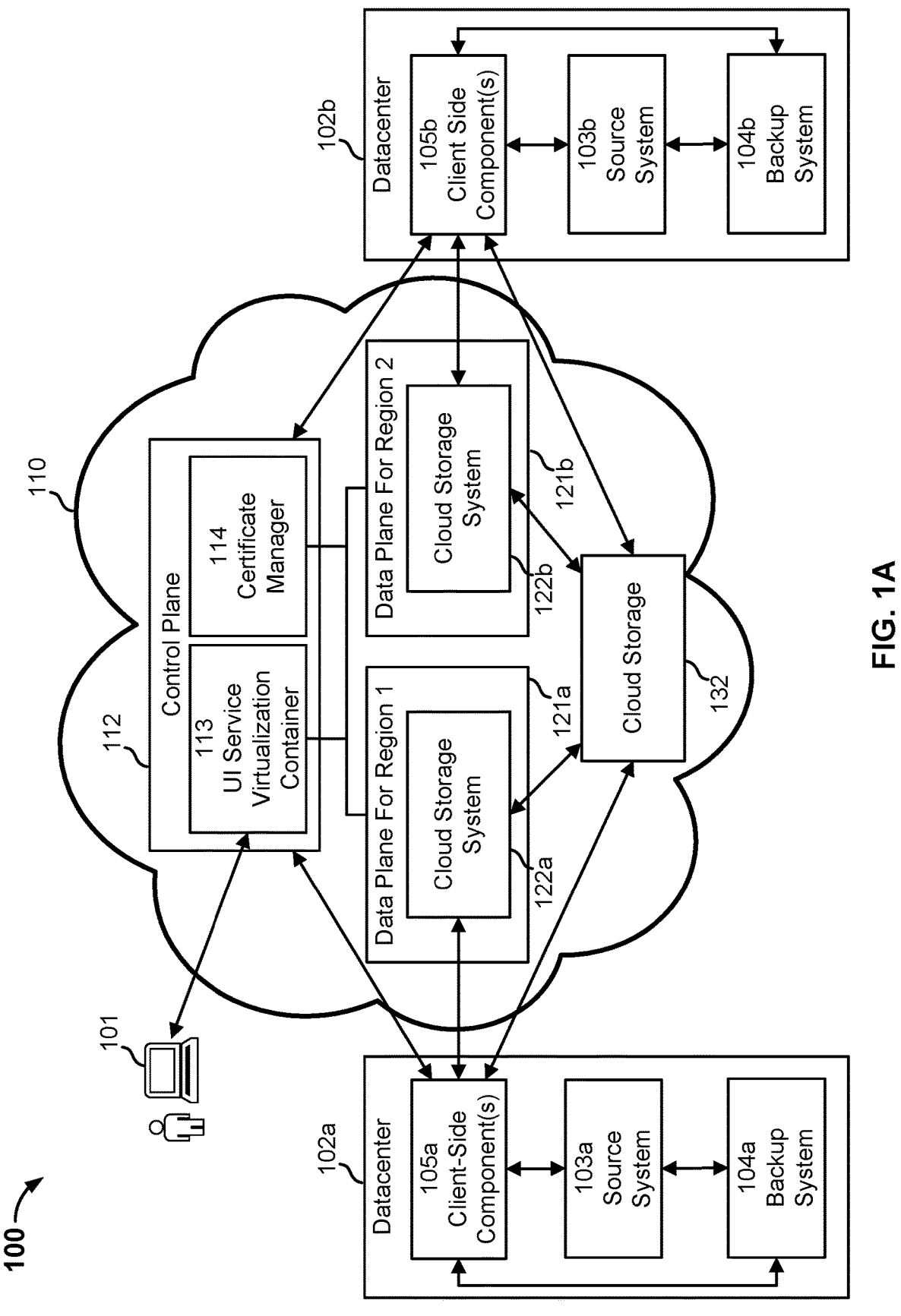
FIG. 1A is a block diagram illustrating a system for certificate management in accordance with some embodiments.

Techniques to revoke and renew certificates are disclosed herein. Other systems may maintain a CRL to control whether a service or an application possessing a certificate is permitted to communicate within a system. However, there are costs associated with maintaining a CRL. For example, maintaining a CRL requires a dedicated service that maintains the CRL. The CRL service also needs to continuously update the CRL. CRL services periodically updates the CRL (e.g., every seven days). It is possible for a certificate to be revoked after a first CRL update, but before a second CRL update. In this scenario, an application or service that uses the revoked certificate may still be permitted to communicate with one or more other applications or services within the system before the second CRL update even though the certificate is revoked.

Instead of relying on a CRL to control communications within a system, the system may include a certificate manager that is configured to modify the metadata that is included in a certificate. The metadata that is included in the certificate may include a version number. The version number may be particular to a storage tenant. The certificate manager may maintain a database for a plurality of certificates. The database may include a data structure that associates a certificate with a reference version number. In the event the version number associated with a certificate is different than the reference version number associated with the certificate, the certificate manager may indicate the certificate is invalid and prevent the application or service that provided the certificate from further communicating within the system.

The certificate manager may be configured to renew one or more certificates that are stored in a database associated with the certificate manager. The certificate manager may be configured to renew certificates based on the certificate type. Examples of certificate types include storage system certificates, storage tenant certificates, client-side component certificates, data plane certificates, cloud storage system certificates, etc. The certificate manager may periodically run (e.g., daily) a scheduler job that is configured to determine whether any of the certificates stored in the database are to expire within a threshold period of time (e.g., 30 days).

Each of the applications or services that need a certificate to communicate within the system are associated with corresponding certificate management services (e.g., microservice, pod, container, etc.). The certificate manager may send via a message bus, a notification to each of the corresponding certificate management services associated with applications or services having a certificate that is to expire within the threshold period of time. A certificate management service may read the message bus and relay messages to the correct application or service (e.g., the application or service with a certificate that is about to expire). The certificate manager may write a notification for the certificate onto the message bus to send to a certificate management service a notification each day until a response is received.

The response from the certificate management service may indicate that the certificate is to be renewed or is to be revoked. In the event the response indicates the certificate is to be revoked, the certificate manager may modify a data structure that associates a certificate with a corresponding reference version number by increasing the reference version number associated with the certificate to be revoked. This prevents an application or service with a revoked certificate from further communicating within the system because when the certificate manager requests the application or service to present its certificate, the certificate manager will deny the application or service with the revoked certificate when the revoked certificate is received from the application or service since the version number associated with the revoked certificate is different than the reference version number associated with the certificate. In the event a response is not received within the threshold period of time, the certificate manager may automatically revoke the certificate to prevent the application or service associated with the revoked certificate from further communicating within the system. In the event the response indicates the certificate should be renewed, a certificate manager may increase a reference version number associated the certificate, modify the metadata associated with the certificate to increase the version number such that the version number included in the certificate matches the reference version number, and provide the new version of the certificate to the application or service associated with the renewed certificate.

FIG. 1A is a block diagram illustrating a system for certificate management in accordance with some embodiments. In the example shown, system 100 enables a user associated with device 101 (e.g., laptop, desktop, mobile phone, smartphone, tablet, smart watch, IoT device, etc.) access a first datacenter 102a and a second datacenter 102b via control plane 112 that is included in a cloud environment 110. The user may be associated with an entity (e.g., enterprise, organization, government, company, user, individual, etc.) that has data centers 102a, 102b that are located at different geographic locations. For example, the first datacenter 102a may be located in California and the second datacenter 102b may be located in New York.

Datacenters 102a, 102b include corresponding source systems 103a, 103b. A source system may be one or more of a server, a virtual machine, a container, a database, etc. In some embodiments, a source system is coupled to a backup system. For example, source system 103a may be coupled to backup system 104a and source system 103b may be coupled to backup system 104b. The entity associated with datacenters 102a, 102b may already have an existing backup system in datacenters 102a, 102b. In some embodiments, a datacenter does not include a backup system.

Datacenters 102a, 102b include corresponding client-side component(s) 105a, 105b. The one or more client-side components 105a, 105b are configured to receive the content to be backed up from corresponding source systems 103a, 103b and/or corresponding backup systems 104a, 104b and to back up the received content to cloud storage 132 (e.g., Amazon Simple Storage Service (S3)). The one or more client-side components 105a, 105b may be a virtual machine, a container, a server, an application, etc. In some embodiments, the one or more client-side components 105a, 105b are included in a corresponding source system 103a, 103b. In some embodiments, the one or more client-side components 105a, 105b are included in a corresponding backup systems 104a, 104b. In some embodiments, source systems 103a, 103b are primary systems. In some embodiments, source systems 103a, 103b are secondary storage systems that backed up data from other sources (not shown). A primary system may be comprised of one or more computing devices (e.g., servers, desktops, laptops, etc.). Backup systems 104a, 104b may be comprised of one or more corresponding backup nodes that include one or more corresponding processors, one or more corresponding memories, and one or more corresponding storage devices.

In some embodiments, the backup nodes of the backup systems 104a, 104b are homogenous nodes where each backup node has the same capabilities (e.g., processing, storage, memory, etc.). In some embodiments, at least one of the backup nodes of the secondary storage system is a heterogeneous node with different capabilities (e.g., processing, storage, memory, etc.) than the other backup nodes of secondary storage system.

In some embodiments, a backup node of backup system 104a, 104b includes a processor, memory, and a plurality of storage devices. The plurality of storage devices may include one or more solid state drives, one or more hard disk drives, or a combination thereof. Backed up data may be stored in the one or more solid state drives, one or more hard disk drives, or a combination thereof.

In some embodiments, a backup node of backup system 104a, 104b includes a processor and memory, and is coupled to a separate storage device. The separate storage device may include one or more storage devices (e.g., flash storage devices). A storage device may be segmented into a plurality of partitions. Each of the backup nodes may be allocated one or more of the partitions. The one or more partitions allocated to a backup node may be configured to store data associated with some or all of the changed objects that were backed up to the secondary storage system. For example, the separate storage device may be segmented into 10 partitions and the secondary storage system may include 10 backup nodes. A backup node of the 10 backup nodes may be allocated one of the 10 partitions.

In some embodiments, a backup node of backup system 104a, 104b includes a processor, memory, and a storage device. A storage device may be segmented into a plurality of partitions. Each of the backup nodes may be allocated one or more of the partitions. The one or more partitions allocated to a backup node may be configured to store data associated with some or all of the changed objects that were backed up to the storage system. For example, the separate storage device may be segmented into 10 partitions and the secondary storage system may include 10 backup nodes. A backup node of the 10 backup nodes may be allocated one of the 10 partitions.

A user associated with an entity may desire to remotely access and manage the data associated with the entity via device 101. However, prior to the user associated with the entity being able to access and manage the data associated with the enterprise, a storage provider may establish the DMaaS infrastructure in cloud environment 110 and datacenters 102a, 102b that enables the user associated with the entity to perform such remote access and management. The storage provider may provide the DMaaS infrastructure for a plurality of different entities. The DMaaS infrastructure may ensure secure communications for the data associated with an entity.

The storage provider may establish a control plane 112 in cloud environment 110 (e.g., public cloud, private cloud, hybrid cloud, etc.) provided by a cloud provider (e.g., Amazon Web Services™, Microsoft™ Azure, Google Cloud™, etc.). Control plane 112 may be configured to manage the DMaaS infrastructure that enables users associated with entities to remotely access and manage their data. Control plane 112 includes one or more cloud servers (not shown). An example of a cloud server is an EC2 instance. The one or more cloud servers may be associated with corresponding processors, corresponding memory, and corresponding storage.

Control plane 112 includes one or more user interface (UI) service virtualization containers 113 that may provide a user associated with an entity via device 101 information associated with the entity. The information may include information about the data stored in source systems 103a, 103b, backup systems 104a, 104b, cloud storage systems 122a, 122b, or cloud storage 132. The information may include the amount of storage available, a list of one or more protection jobs available to be restored, etc. UI service virtualization container 113 may receive from device 101 one or more commands to perform with respect to the data associated with an entity. UI service virtualization container 113 is configured to forward the one or more commands to the components of the DMaaS infrastructure that enable the one or more commands to be performed. Although FIG. 1A depicts a single UI service virtualization container, control plane 112 may include n UI service virtualization containers that are distributed across one or more cloud servers of control plane 112. In some embodiments, a UI service virtualization container may be used by n users.

An entity for which a storage provider provides system 100 may be referred herein to as a "storage tenant." Control plane 112 may generate a data plane for a plurality of different regions. For example, data plane 121*a* may be associated with the western part of the United States and data plane 121*b* may be associated with the eastern part of the United States. A data plane may include one or more cloud storage systems that are each comprised of one or more cloud servers (e.g., EC2 instances). A cloud storage system may be generated for one or more storage tenants. A storage tenant may be associated with one or more cloud storage systems, where each of the one or more cloud storage systems is located in a different region. For example, datacenters 102*a*, 102*b* may be associated with a first storage tenant. The first storage tenant may be associated with cloud storage systems 122*a*, 122*b*.

A client-side component, such as client-side components 105*a*, 105*b*, may backup to cloud storage 132 data associated with a source system, such as source systems 103*a*, 103*b*, or data associated with a backup system, such as backup systems 104*a*, 104*b*. A cloud storage system, such as cloud storage systems 122*a*, 122*b*, may generate metadata for the data that is stored at cloud storage 132. In some embodiments, a cloud storage system, such as cloud storage system 122*a*, 122*b*, may store the generated metadata at cloud storage 132.

Certificates (i.e., a digital certificate) may be distributed to different applications or services within system 100 to ensure secure communications. For example, corresponding certificates may be distributed to client-side component(s) 105*a*, 105*b*, cloud storage systems 122*a*, 122*b*, backup systems 104*a*, 104*b*, UI service virtualization container 113, etc. Certificate manager 114 may be configured to manage the plurality of certificates that are distributed throughout system 100.

Instead of relying on a CRL to control communications within system 100, certificate manager 114 may be configured to modify the metadata that is included in a certificate. The metadata that is included in the certificate may include a version number. The version number may be particular to a storage tenant. The certificate manager 114 may maintain a data structure that associates a certificate with a reference version number. In the event the version number included in a certificate is different than the reference version number associated with the certificate, certificate manager 114 may indicate the certificate is invalid and prevent the application or service that provided the certificate from further communicating within system 100. In some embodiments, multiple certificates associated with an application or service may have the same reference version number.

Certificate manager 114 is configured to renew certificates for a plurality of applications or services within system 100. For example, certificate manager 114 may renew certificates for client-side component(s) 105*a*, 105*b*, cloud storage systems 122*a*, 122*b*, backup systems 104*a*, 104*b*, UI service virtualization container 113, etc. Certificate manager 114 may maintain a database of certificates. Certificate manager 114 may run a scheduler job that is configured to determine whether any of the certificates are to expire within a threshold period of time (e.g., 30 days). Each of the applications or services that need a certificate to communicate within system 100 are associated with a corresponding certificate management service (e.g., microservice, pod, container, etc.). Certificate manager 114 may send via a message bus, a notification to each of the corresponding certificate management services associated with applications or services (not shown) having a certificate that is to expire within the threshold period of time. The notification may be queued in a message buffer included in the message bus. Certificate manager 114 may send to a certificate management service a notification each day until a response is received. The response from the certificate management service may indicate that the certificate should be renewed or revoked. In the event the response indicates the certificate has been revoked, certificate manager 114 may increase the reference version number associated with the certificate. This prevents the revoked certificate from being used to communicate within system 100 because the version number included in the revoked certificate is different than the reference version number associated with the certificate. In the event the response indicates the certificate should be renewed, certificate manager 114 may increase a reference version number associated the certificate and modify the metadata associated with the certificate to increase the version number such that the version number included in the certificate matches the reference version number.

Figure 1B:
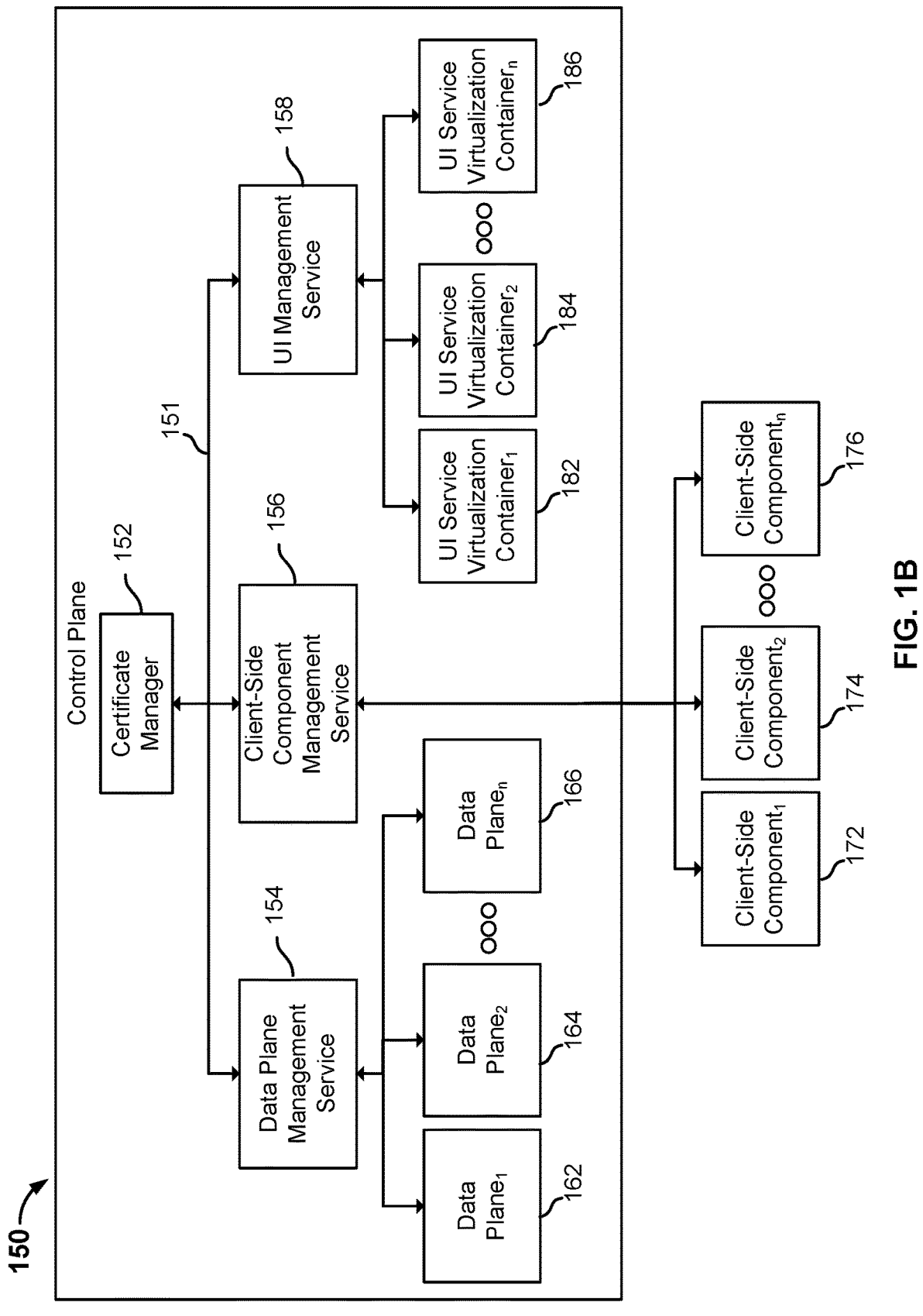
FIG. 1B is a block diagram illustrating a control plane in accordance with some embodiments.

FIG. 1B is a block diagram illustrating a control plane in accordance with some embodiments. In the example shown, control plane 150 may be implemented as a control plane, such as control plane 112.

Control plane 150 includes certificate manager 152 that is configured to renew certificates for a plurality of applications or services. For example, certificate manager 152 may renew certificates for a first data plane 162, a second data plane 164, . . . , and/or an nth data plane 166. Although FIG. 1B depicts three data planes, control plane 150 may include n data planes.

In some embodiments, certificate manager 152 renews certificates for a first client-side component 172, a second client-side component 174, . . . , and/or an nth client-side component 176. Although FIG. 1B depicts three client-side components, control plane 150 may be associated with n client-side components. A client-side component may be located outside of control plane 150, for example, within a datacenter associated with a storage tenant, such as datacenters 102*a*, 102*b*. In some embodiments, one or more client-side components are located within control plane 150.

In some embodiments, certificate manager 152 renews certificates for a first UI service virtualization container 182, a second UI service virtualization container 184, . . . , and/or an nth UI service virtualization container 186. Although FIG. 1B depicts three UI service virtualization containers, control plane 150 may include n UI service virtualization containers.

Certificate manager 152 may maintain a database of certificates (not shown). Certificate manager 152 may run a scheduler job that is configured to determine whether any of the certificates associated with any of the data planes, any of the client-side components and/or any of the UI service virtualization containers are to expire within a threshold period of time (e.g., 30 days).

Each of the applications or services that need a certificate to communicate are associated with a certificate management service (e.g., microservice, pod, container, etc.). For example, data plane management service 154 is a certificate management service for data planes 162, 164, 166, client-side component management service 156 is a certificate management service for client-side components 172, 174, 176, and UI management service 158 is a certificate management service for UI service virtualization containers 182, 184, 186.

Certificate manager 152 may send via a message bus 151, a notification to each of the corresponding certificate management services associated with applications or services having a certificate that is to expire within the threshold period of time. In response to receiving the notification, a certificate management service is configured to determine which of the applications or services associated with the certificate management service need to renew their corresponding certificates. For example, certificate manager 152 may send data plane management service 154 the notification. Data plane management service 154 may inspect the notification and determine which of the data planes 162, 164, 166 need to have their corresponding certificate renewed.

The certificate management service may send to the determined application or service a message indicating a certificate needs to be renewed. For example, data plane management service 154 may determine that the certificate associated with data plane 162 needs to be renewed. The certificate management service may forward to certificate manager the response received from the determined application or service. For example, data plane management service 154 may receive a response from data plane 162 and provide the response to certificate manager 152.

The notification may be queued in a message buffer included in message bus 151 until a response is received from a certificate management service. Certificate manager 152 may send to a certificate management service a notification each day until a response is received.

The response from the certificate management service may indicate that the certificate should be renewed or has been revoked. In the event the response indicates the certificate should be revoked, certificate manager 152 may increase the reference version number associated with the certificate. This prevents the revoked certificate from being used to communicate within the DMaaS infrastructure because the version number included in the revoked certificate is different than the reference version number associated with the certificate. In the event the response indicates the certificate should be renewed, certificate manager 152 may increase a reference version number associated the certificate and modify the metadata associated with the certificate to increase the version number such that the version number included in the certificate matches the reference version number.

Figure 2:
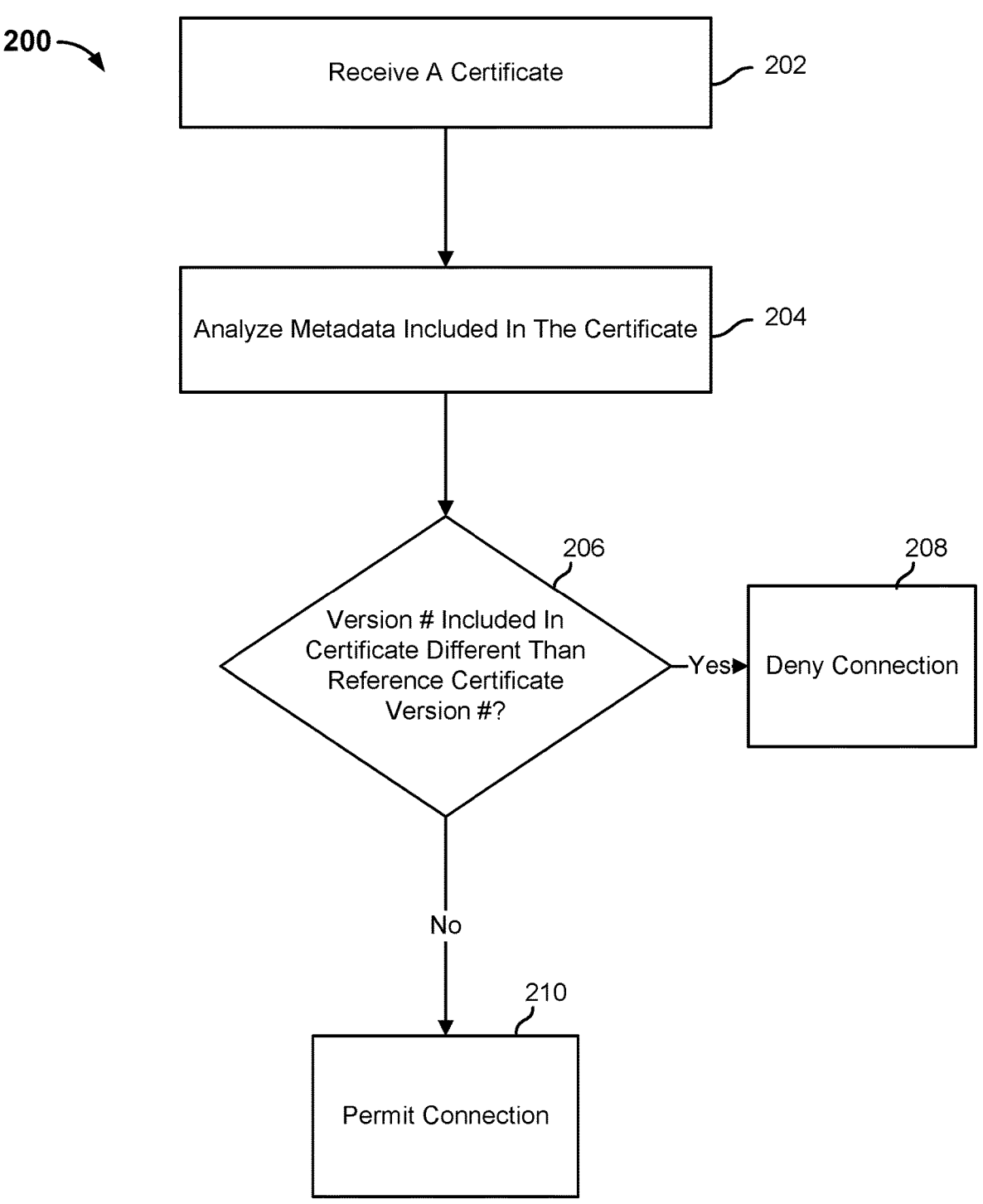
FIG. 2 is a flow diagram illustrating a process for verifying certificates in accordance with some embodiments.

FIG. 2 is a flow diagram illustrating a process for verifying certificates in accordance with some embodiments. In the example shown, process 200 may be implemented by a certificate manager, such as certificate manager 114.

At 202, a certificate is received. An application or service may present to a certificate manager the certificate prior to communications with another application or service.

At 204, metadata included in the certificate is analyzed. The metadata included in the certificate may include a version number. The version number may be particular to a storage tenant.

At 206, it is determined whether a version number of the certificate is different than a reference certificate version number. The certificate manager may be associated with a database that stores a data structure that associates certificates with a reference version number. The certificate manager may compare the version number included in the certificate to the reference version number associated with the certificate.

In the event a version number included in the certificate is different than a reference version number associated with the certificate, process 200 proceeds to 208 where communications are denied.

In the event a version number of the certificate is different than a reference certificate version number, process 200 proceeds to 210 where communications are permitted.

Figure 3:
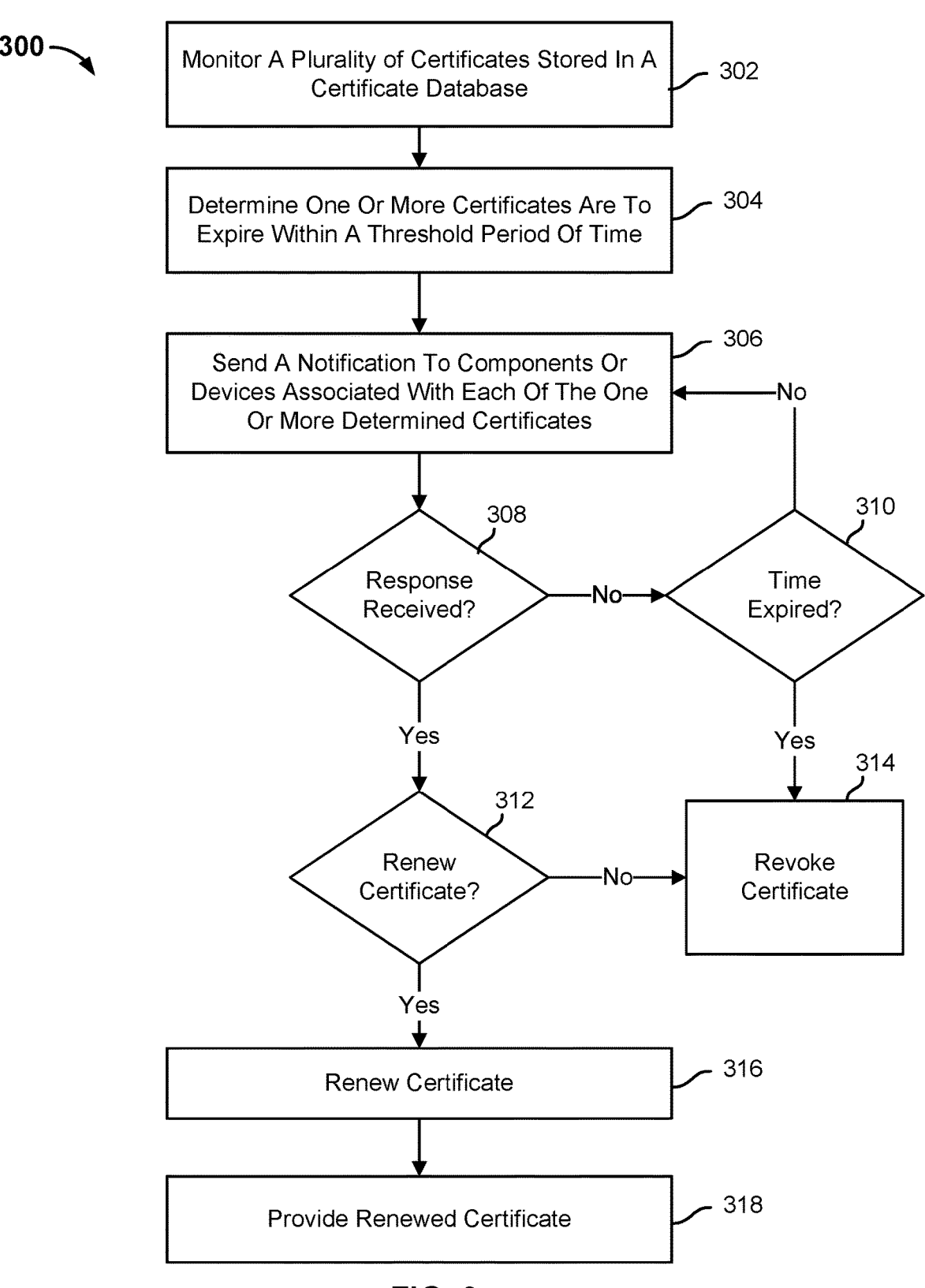
FIG. 3 is a flow diagram illustrating a process for renewing certificates in accordance with some embodiments.

FIG. 3 is a flow diagram illustrating a process for renewing certificates in accordance with some embodiments. In the example shown, process 300 may be implemented by a certificate manager, such as certificate manager 104.

At 302, a plurality of certificates stored in a certificate database are monitored. The plurality of certificates may be periodically monitored (e.g., daily).

At 304, one or more certificates are determined to expire within a threshold period of time. The threshold period of time (e.g., 15 days, 30 days, etc.) may be specified by the storage provider. The threshold period of time may be specified by certificate type.

At 306, a notification is sent via a message bus to certificate management services associated with each of the one or more determined certificates. The notification may be queued in a message buffer included in the message bus. In some embodiments, a certificate management service associated with an application or service that needs to renew a certificate may intercept the notification and determine whether to renew the certificate on behalf of the application or service. In some embodiments, a certificate management service associated with an application or service that needs to renew a certificate receives a renewal response from the application or service.

At 308, it is determined whether a response is received from a certificate management service. In the event a response is received, process 300 proceeds to 312. In the event a response is not received, process 300 proceeds to 310. A notification of the one or more corresponding notifications remains in the message buffer until a response to the notification is received from a corresponding certificate virtualization container or a threshold period of time has expired (e.g., a response was not received).

At 310, it is determined whether the threshold period of time has expired. In the event the threshold period of time has not expired, process 300 returns to 306. In the event the threshold period of time has expired, process 300 proceeds to 314 where the certificate is revoked. The certificate manager revokes the certificate by increasing the reference version number associated with the certificate. This prevents the revoked certificate from being used to communicate because the version number included in the certificate is different than the reference version number associated with the certificate.

At 312, it is determined whether the response indicates to renew the certificate. In the event the response indicates to renew the certificate, process 300 proceeds to 316. At 316, At 316, the certificate is renewed. The certificate manager may renew the certificate by increasing a reference version number associated the certificate and modifying the metadata included in the certificate to increase the version number such that the version number included in the certificate matches the reference version number associated with the certificate.

At 318, the renewed certificate is provided to the application or service associated with the renew response. In some embodiments, the certificate is provided via a gRPC connection, an HTTPS connection, or any other type of secure connection. In some embodiments, the certificate is provided as an API response to a certificate management service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
distributing, to an application or service associated with a storage tenant that interfaces with a data management as a service infrastructure that includes a private certificate authority, a private certificate including metadata;
maintaining, in a control plane environment of the data management as a service infrastructure, a data structure including a reference certificate version number corresponding to the private certificate, wherein the storage tenant is outside the control plane environment;
analyzing, by the data management as a service infrastructure, the metadata included in the private certificate received from the application or service associated with the storage tenant;
comparing a certificate version number included in the analyzed metadata to the reference certificate version number;
permitting the application or service to communicate with other applications or services associated with the data management as a service infrastructure based on comparing the certificate version number to the reference certificate version number, wherein the reference certificate version number is particular to the storage tenant; and
renewing the private certificate by modifying, with a certificate manager of the control plane environment, the reference certificate version number at the control plane environment and modifying, with the certificate manager of the control plane environment, the certificate version number included in the metadata included in the private certificate at the storage tenant to match the reference certificate version number.

2. The method of claim 1, further comprising receiving the private certificate from the application or service associated with the storage tenant.

3. The method of claim 1, further comprising permitting the application or service associated with the storage tenant to communicate with the other applications or services associated with the data management as a service infrastructure in response to determining that the certificate version number is equal to the reference certificate version number particular to the storage tenant.

4. The method of claim 1, further comprising denying the application or service associated with the storage tenant to communicate with the other applications or services associated with the data management as a service infrastructure in response to determining that the certificate version number is less than the reference certificate version number particular to the storage tenant.

5. The method of claim 1, further comprising monitoring a plurality of private certificates that are stored in the data structure, wherein the plurality of private certificates includes the private certificate received from the application or service.

6. The method of claim 5, further comprising determining the private certificate is set to expire within a threshold period of time.

7. The method of claim 1, further comprising:
based on determining the private certificate is set to expire within a threshold period of time, sending via a message bus a notification to a certificate management service associated with the private certificate,
wherein renewing the private certificate comprises renewing the private certificate based on a response received from the certificate management service.

8. The method of claim 7, wherein the message bus includes a message buffer.

9. The method of claim 8, wherein the notification remains in the message buffer until the response to the notification is received from the certificate management service associated with the private certificate or the threshold period of time has passed.

10. The method of claim 7, wherein the response received from the certificate management service indicates that the private certificate should be renewed.

11. The method of claim 10, wherein renewing the private certificate includes increasing, with the certificate manager of the control plane environment, the reference certificate version number at the control plane environment and modifying, with the certificate manager of the control plane environment, the certificate version number included in the metadata included in the private certificate at the storage tenant to be equal to the reference certificate version number.

12. The method of claim 11, further comprising providing the renewed private certificate to the application or service that requested the private certificate to be renewed.

13. The method of claim 7, wherein renewing the private certificate based on the response received from the certificate management service includes revoking the private certificate in response to not receiving the response within the threshold period of time.

14. The method of claim 7, wherein the response received from the certificate management service indicates the private certificate is to be revoked, the method further comprising revoking, based on the response received from the certificate management service, the private certificate by modifying, with the certificate manager of the control plane environment, the reference certificate version number at the control plane environment and without modifying the certificate version number included in the metadata such that the reference certificate version number is different than the certificate version number.

15. A computer program product embodied in a non-transitory computer readable medium and comprising computer instructions that, when executed by processing circuitry, cause the processing circuitry to:

distribute, to an application or service associated with a storage tenant that interfaces with a data management as a service infrastructure that includes a private certificate authority, a private certificate including metadata;

maintain, in a control plane environment of the data management as a service infrastructure, a data structure including a reference certificate version number corresponding to the private certificate, wherein the storage tenant is outside the control plane environment;

analyze, by the data management as a service infrastructure, the metadata included in the private certificate received from the application or service associated with the storage tenant;

compare a certificate version number included in the analyzed metadata to the reference certificate version number;

permit the application or service to communicate with other applications or services associated with the data management as a service infrastructure based comparing the certificate version number to the reference certificate version number, wherein the reference certificate version number is particular to the storage tenant; and renew the private certificate by modifying, with a certificate manager of the control plane environment, the reference certificate version number at the control plane environment and modifying, with the certificate manager of the control plane environment, the certificate version number included in the metadata included in the private certificate at the storage tenant to match the reference certificate version number.

16. The computer program product of claim 15, wherein the computer instructions, when executed by processing circuitry, cause the processing circuitry to receive the private certificate from the application or service associated with the storage tenant.

17. The computer program product of claim 15, wherein the computer instructions, when executed by processing circuitry, cause the processing circuitry to permit the application or service associated with the storage tenant to communicate with the other applications or services associated with the data management as a service infrastructure in response to determining that the certificate version number is equal to reference certificate version number particular to the storage tenant.

18. The computer program product of claim 15, wherein the computer instructions, when executed by processing circuitry, cause the processing circuitry to deny the application or service associated with the storage tenant to communicate with the other applications or services associated with the data management as a service infrastructure in response to determining that the certificate version number associated with the private certificate is less than the reference certificate version number particular to the storage tenant.

19. The computer program product of claim 15, wherein the computer instructions, when executed by processing circuitry, cause the processing circuitry to monitor a plurality of private certificates that are stored in the data structure, wherein the plurality of private certificates includes the private certificate received from the application or service.

20. A system, comprising:

one or more processors configured to:

distribute, to an application or service associated with a storage tenant that interfaces with a data management as a service infrastructure that includes a private certificate authority, a private certificate including metadata;

maintain, in a control plane environment of the data management as a service infrastructure, a data structure including a reference certificate version number corresponding to the private certificate, wherein the storage tenant is outside the control plane environment;

analyze, by the data management as a service infrastructure, metadata included in the private certificate received from the application or service associated with the storage tenant;

compare a certificate version number included in the analyzed metadata to the reference certificate version number;

permit the application or service to communicate with other applications or services associated with the data management as a service infrastructure based on a comparison of the certificate version number associated with the certificate to the reference certificate version number, wherein the reference certificate version number is particular to the storage tenant; and renew the private certificate by modifying, with a certificate manager of the control plane environment, the reference certificate version number at the control plane environment and modifying, with the certificate manager of the control plane environment, the certificate version number included in the metadata included in the private certificate at the storage tenant to match the reference certificate version number; and a memory coupled to the one or more processors and configured to provide the one or more processor with instructions.

\* \* \* \* \*